United States Patent Office 3,402,166
Patented Sept. 17, 1968

3,402,166
MONOAZO AND DISAZO DYES CONTAINING CYCLIC DICARBOXYLIC ACID IMIDE GROUPS
Leonhard Heckl, Besigheim, Kurt Heinle, Stuttgart, and Egon Liedek, Esslingen, Germany, assignors to Siegle & Co. G.m.b.H., Stuttgart-Feuerbach, Germany
No Drawing. Filed Aug. 31, 1964, Ser. No. 393,355
Claims priority, application Germany, Sept. 3, 1963, S 87,058
8 Claims. (Cl. 260—152)

ABSTRACT OF THE DISCLOSURE

An azo dye molecule containing at least one group selected from the class consisting of at least one of the radicals of the formula:

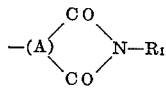

and

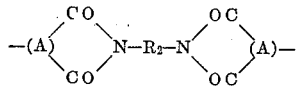

wherein the substitute A is a simple or condensed aromatic or heterocyclic system, wherein $R_1$ is selected from the group consisting of hydrogen, alkyl, aryl, aralkyl and heterocyclic radicals, or substitution products thereof, and wherein $R_2$ is a divalent radical derived from a radical selected from the group consisting of alkyl, aryl, aralkyl and heterocyclic radicals. These dyes have improved properties of color fastness, resistance to solvents and to bleeding.

---

The present invention relates to new monoazo and diazo pigments and methods of producing the same, and more particularly to new monoazo and diazo pigments which have improved properties of color fastness, resistance to solvents and to bleeding.

Attempts have been made in the past to increase the size of dye molecules of the azo type in order to improve the properties of the resulting dye molecule, particularly with respect to fastness, to solvents and bleeding. However, the dye molecules previously produced for this purpose were limited in their usefulness with respect to the properties thereof, with respect to the stability thereof, and particularly with respect to the difficulties of producing the same.

It is accordingly a primary object of the present invention to provide new azo dye molecules which can be produced easily, which are extremely stable and which provide the desired properties of fastness particularly against solvents and bleeding.

It is another object of the present invention to provide for the production of the new azo dye molecules of this invention.

Other objects and advantages of the present invention will be apparent from a further reading of the specification and of the appended claims.

With the above and other objects in view, the present invention mainly comprises an azo dye molecule containing at least one group selected from the class consisting of at least one of the radicals of the formula:

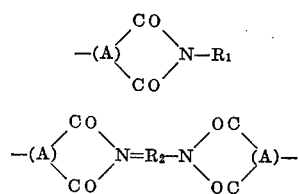

wherein the substituent A is a simple or condensed aromatic or heterocyclic system, wherein $R_1$ is selected from the group consisting of hydrogen, alkyl, aryl, aralkyl and heterocyclic radicals, or substitution products thereof, and wherein $R_2$ is a divalent radical derived from a radical selected from the group consisting of alkyl, aryl, aralkyl and heterocyclic radicals.

The substituent A which is a simple or condensed aromatic or heterocyclic system is preferably benzene, naphthalene, anthracene, phenanthrene, pyrene, 1,8-trimethylenenaphthalene, pyridine or quinoline.

The substituent $R_1$ is preferably hydrogen, methyl, ethyl, propyl, butyl, stearyl, phenyl, naphthyl, benzyl, or one of the heterocyclic radicals derived from pyridine, quinoline, pyrimidine, uracil, thiouracil or acridine.

The substituent $R_2$ is preferably a divalent radical derived from ethane, propane, butane, pentane, hexane, benzene, diphenyl, naphthalene, diphenylmethane, stilbene, diphenylamine, diphenyl ether, diphenyl sulfide, diphenyl sulfone, benzophenone, pyridine, quinoline, acridine, diphenyl oxide, carbazole, pyrimidine or triazine.

The advantageous properties of the new azo dyes of the present invention (the term "azo dyes" as used herein is meant to include both monoazo and diazo dyes as well as polyazo dyes of all types) results from the presence in the dye molecule of one or more of the cyclic dicarboxylic acid imide structures as set forth above, and this may be brought into the azo dye molecule, which is obtained by the reaction of a diazo component or a tetra-azo component with a coupling component, by having such cyclic dicarboxylic acid imide structure in either the azo component or the coupling component or both.

In other words, in accordance with the present invention, the azo dyes of the invention are produced either:

(a) By reacting a diazo component or tetra-azo component with a coupling component wherein the diazo component or tetra-azo component contains the above 5-member or 6-member cyclic dicarboxylic acid imide structure; or (b) Reacting a diazo component or tetra-azo component with a coupling component wherein the coupling component contains the above 5-member or 6-member cyclic dicarboxylic acid imide structure; or (c) Reacting a diazo component or tetra-azo component with a coupling component wherein both the azo component and the coupling component each contain at least one 5-member or 6-member cyclic dicarboxylic acid imide structure.

In the first case, that is wherein the cyclic dicarboxylic acid imide ring structure is in the diazo component or the tetra-azo component, the reaction proceeds either:

(a) Through a diamine with a free amino group which is characterized by the structure:

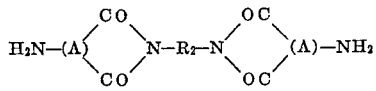

or (b) Through a N-acylated derivative of an amino-dicarboxylic acid imide with a free amino group, and having the structure:

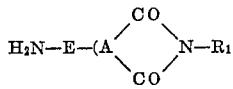

which is in known manner either tetra-azotized or diazotized, and is reacted with the normal coupling components. In the above formulas, the substituents A, $R_1$ and R have the same definitions as above, and E is the acyl radical of an aromatic carboxylic acid or aromatic sulfonic acid, such as benzoyl, benzenesulfonyl, naphthoyl and naphthalenesulfonyl radicals.

Diamines of the type set forth under (a) above can be obtained, for example, by the reaction of an amino diacarboxylic acid with ortho-position or para-position carboxyl groups with the usual diamines, whereby two molecules of the amino dicarboxylic acid are bound by the diamine.

The N-acylated derivatives of amino-dicarboxylic acids with free amino groups, of the type set forth under (b) above, can, for example, be obtained by reacting the nitro compound of an acid halogenide of an aromatic carboxylic or sulfonic acid with an amino dicarboxylic acid imide or phenylimide, and reducing the thus obtained nitroacyl derivative.

In the second type of reaction given above, in which the typical imide ring structure is contained in a coupling component, the reaction proceeds through acetoacetic arylides or 2,3-oxynaphthoic acid arylides of the following structure:

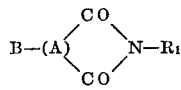

or

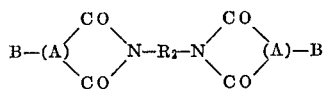

which can be produced by generally known methods. In the above formulas the substituents A, $R_1$, and $R_2$ have the same definitions as previously, and B is an acetoacetylamino radical or a 2,3-oxynaphthoylamino radical. On proceeding in this manner to produce the azo dyes of the present invention, the mentioned coupling components are combined with diazonium or tetrazonium salts of usual structure to form the dyes or pigments of the present invention.

It is to be understood that in connection with the above named coupling component there are also to be included diamines which contain the typical dicarboxylic imide structure and which are acylated with acetoacetic esters or 2,3-oxynaphthoic acid esters either on both amino groups with the same component or on each amino group with a different component, whereby in the latter case a mixed acetoacetic- and 2,3-oxynaphthoic acid arylide is obtained.

The third type of reaction for producing the azo dyes of the present invention is a combination of the first and second variants in which the typical imide ring structure is contained in both the azo component and the coupling component.

Dye products of the azo type containing the cyclic dicarboxylic acid imide structure can be obtained by reacting a monoazo dye component with a mono-amine, in which case the dye products would have one of the following structures:

(a) 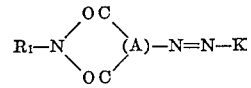

(b) 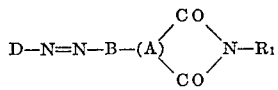

(c) 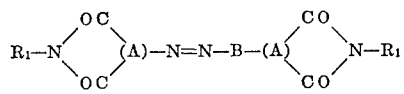

Dye products containing the typical cyclic dicarboxylic imide structure may also be obtained by reacting a monoazo dye with a diamine or by reacting a diazo dye with a mono-amine, in which case the resulting dye product will have one of the following structures:

(a) 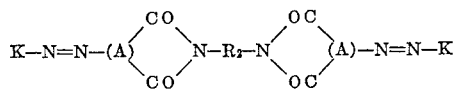

(b) 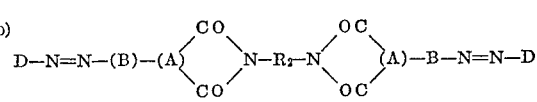

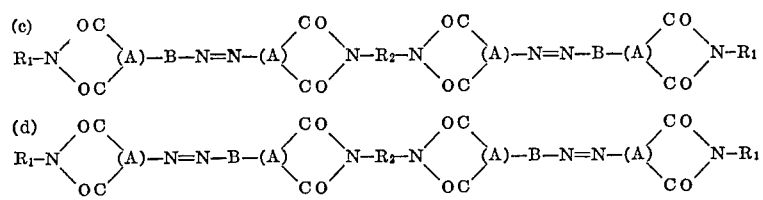

In the above formulas the substituents A, $R_1$, $R_2$ and B have the same definitions as previously given. In addition, the substituent D is the residue of an aromatic or heterocyclic diazotizable amine, e.g. phenyl, naphthyl, pyridyl, etc. The substituent K is the residue of a normal coupling component such as beta-naphthol, beta-oxynaphthoic acid, phenylmethylpyrazolone, 2,4-dioxyquinoline, acetoacetic acid arylamide or 2,3-oxynaphthoic acid arylamide.

The dyes and pigments produced according to the present invention, because of the presence therein of the 5-member or 6-member dicarboxylic imide ring, possess great stability, and in addition, because of the increased molecular weight resulting from the incorporation of the cyclic imide radical therein, also possess improved fastness particularly with respect to solvents and against bleeding.

The fastness of these dyes or pigments is increased both as a result of the higher molecular weight and as a result of the extreme stability of the 5-member or 6-member rings of the typical dicarboxylic acid imide structure. Furthermore, by means of the present invention there is obtained an extension or increase of the color palette as a result of the accumulation of the chromophoric dicarboxylic acid imide structures. Still another advantage of the azo dyes of the present invention is that the dicarboxylic acid imide structure results in a reduction of the solubility of the dyes in organic solvents.

The following examples are given to further illustrate the present invention. The scope of the invention is not, however, meant to be limited to the specific details of the examples.

Example 1

4.07 g. of 3-(p-aminobenzoylamino)-naphthalic acid phenylimide are made into a paste with 6.00 cc. of hydrochloric acid (31%) and 6 cc. of water and the paste is thoroughly stirred. The diazotizing proceeds at 0° C. by the addition of 0.70 g. of sodium nitrite which is dissolved in 7 cc. of water.

The suspension of the diazonium salt is stirred for one additional hour and then introduced into a solution of 2.80 g. of 2-(2′,3′-oxynaphthoylamino)-toluene (Naphthol AS-D), and 1.20 g. of caustic soda in 50 cc. of water. When the dye suspension exhibits a pH value of 7, an additional 10 cc. of 10% caustic soda solution is added so that the pH value is adjusted to 7.5–8. The stirring is continued for three hours, the reaction mixture is acidified with acetic acid to pH 3, and the reaction mixture is heated to boiling.

The resulting red pigment dye is filtered off, washed and dried. The yield amounts to 6.80 g. The new red pigment dye is difficultly soluble in most organic solvents.

To produce the 3-(p-aminobenzoylamino)-naphthalic acid phenylimide, 3-aminonaphthalic acid anhydride is condensed by known methods with p-nitrobenzoyl chloride. The resulting 3-(p-nitrobenzoylamino)-naphthalic acid anhydride is a yellow substance which can be recrystallized from nitrobenzene and melts at above 360° C. By reduction according to the method of Bechamp, there is obtained from the 3-(p-nitrobenzoylamino)-naphthalic acid anhydride, the yellowish-orange colored 3-(p-aminobenzoylamino)-naphthalic acid anhydride, which also melts at above 360° C. By heating with an excess of aniline, the above compound is converted into the yellowish 3-(p-aminobenzoylamino)-naphthalic acid phenylimide which melts at 322–323° C.

Example 2

3.96 g. of 3-(4′-methoxy-3′-aminobenzenesulfonyl)-aminonaphthalic acid-imide and 0.80 g. of caustic soda are dissolved in 20 cc. of water. The solution which is cooled to 0° C. is reacted with 0.70 g. of sodium nitrite dissolved in 7 cc. of water and at 0° C. acidified with 5.00 cc. of 37% hydrochloric acid which has been diluted with the same amount of water.

The resulting diazonium salt suspension is stirred for one additional hour and then added at room temperature to 2.80 g. of 1-(acetoacetylamino)-2,5-dimethoxy-4-chlorobenzene which was first dissolved in 20 cc. of 80% acetic acid, and subsequently precipitated with a solution of 2.4 g. of caustic soda in 24 cc. of water. After the completion of the coupling, the reaction mixture is heated to boiling, filtered, washed and dried. The pigment dye which is obtained in a yield of 6.60 g. is greenish yellow and is very difficultly soluble in most organic solvents.

To produce the 3-(4′-methoxy-3′-aminobenzenesulfonyl)-aminonaphthalic acid-imide, the compound 3-aminonaphthalic acid anhydride is used as starting material and is condsensed in soda-alkalinated solution with 4-methoxy-3-acetylaminobenzenesulfonyl chloride. The thus formed 3-(4′-methoxy-3′-acetylamino-benzenesulfonyl)-aminonaphthalic acid anhydride is pale yellow and melts after two recrystallizations from nitrobenzene at 280–281° C.

After saponification for 4 hours with aqueous sodium hydroxide, acidification with hydrochloric acid, and subsequent short boiling up, there is obtained from the above acetylamino compound the compound 3-(4′-methoxy-3′-aminobenzenesulfonyl)-aminonaphthalic acid anhydride. The compound is yellow and melts after two recrystallizations from nitrobenezene at 251.5–253° C. Upon cooking for 3 hours with an excess of 25% ammonia, the above compound is converted into the yellow 3-(4′-methoxy-3′-aminobenzenesulfonyl)-aminonaphthalic acid imide, which after one recrystallization from nitrobenzene melts at 282–284° C.

Example 3

10.10 g. of 2,5-dichloroaniline are dissolved under boiling in 100 cc. of water and 19.50 cc. of 37% hydrochloric acid, and the resulting solution is cooled with ice to 0° C. At this temperature there is quickly added under vigorous stirring 4.50 g. of sodium nitrite which is dissolved in 30 cc. of water, and this stirring is continued until a clear solution results (30–45 minutes). The solution is filtered with activated carbon and at 30–35° C. is added to a suspension of 29.00 g. of 4-(beta-oxynaphthoyl)-aminonaphthalic acid phenylimide which is obtained by first dissolving this substance in 200 cc. of alcohol, 5.00 g. of caustic soda and 200 cc. of water and then precipitating under vigorous stirring at 20° C. with 10 cc. of glacial acetic acid. For the coupling reaction, an additional 9.3 g. of sodium acetate is sprinkled in. The reaction time requires 2–3 hours.

To improve the texture it is advisable during the coupling to add 5.00 g. of Emulphor A (fatty acid-oxyethylate, with about 6 moles of ethylene oxide). After the addition of the diazonium salt solution, the coupling is practically completed. The reaction mixture is stirred for an additional hour, heated to boiling, filtered and washed, and then dried at 60° C. The new pigment dye is a blue-red powder of soft texture which is difficultly soluble in most organic solvents.

The 4-(beta-oxynaphthoylamino)-naphthalic acid-N-phenylimide which serves as the coupling component in the above example is obtained according to known methods by the condensation of 4-aminonaphthalic acid-N-phenylimide with beta-oxynaphthoic acid. The new compound is yellow and melts after recrystallization from nitrobenzene at 313–315° C.

Example 4

10.1 g. of 2,4-dichloroaniline are dissolved under boiling in 100 cc. of water and 19.5 cc. of 37% hydrochloric acid. The solution is cooled with ice to 0° C., and under vigorous stirring diazotized with a solution of 4.5 g. of sodium nitrite in 45 cc. of water.

After 30 minutes of stirring, the solution is mixed with activated carbon and filtered. The diazonium salt solution is then introduced dropwise at room temperature into a solution of 29.00 g. of 3-(beta-oxynaphthoylamino)-naphthalic acid phenylimide, 200 cc. of dimethylformamide and 50 cc. of 10% sodium hydroxide solution. When the dye suspension exhibits a pH value of 7, an additional amount of 10% aqueous sodium hydroxide is added to raise the pH value to 7.5–8. After 3 hours of stirring, the dye suspension is acidified with acetic acid to a pH value of 3, and heated to boiling. After cooling, the reaction mixture is filtered, washed and dried at 60° C. The yield amounts to 39.00 g. The new pigment dye is a luminous red powder having a soft texture, and it is difficultly soluble in most organic solvents.

The coupling component used in this example, 3-(beta-oxynaphthoylamino)-naphthalic acid-N-phenylimide is obtained according to known procedures by condensation of 3-aminonaphthalic acid-N-phenylimide with beta-oxynaphthoic acid. This new compound is pale yellow and melts after recrystallization from nitrobenzene at 293–296° C.

Example 5

14.10 g. of 6-chloro-2-aminotoluene are stirred with 300 cc. of water and 33.0 cc. of 37% hydrochloric acid. After the addition of ice, 7.00 g. of sodium nitrite dissolved in 70 cc. of water are added, and the solution stirred for one-half hour at 0° C. The solution of the diazonium salt is mixed with activated carbon, filtered, and during a time period of 15 minutes added to a suspension, cooled to 5° C., of 46.00 g. of di-[3-(beta-oxynaphthoyl)-aminonaphthalyl]benzidine in 600 cc. of dimethylformamide, which had been reacted with a solution of 16.00 g. of caustic soda in 100 cc. of water. The temperature is maintained at 5–10° C. during the coupling. In order that the pH value does not go below 8, approximately 60 cc. of 10% aqueous sodium hydroxide are added dropwise during the coupling. After combining of the two components the reaction mixture is stirred for an additional 3 hours, adjusted to a pH value of 3 with acetic acid, heated to boiling, filtered, washed and dried. There is thus obtained 57.00 of a bluish-red pigment dye which is difficultly soluble in most organic solvents.

To produce the di-[3-(beta-oxynaphthoyl)-aminonaphthalyl]-benzidine which serves as coupling component in this example, 3-aminonaphthalic acid anhydride is condensed with beta-oxynaphthoic acid according to known methods. The thus resulting 3-(beta-oxynaphthoylamino)-naphthalic acid anhydride is yellow and melts after recrystallization from dimethylformamide at 346–348° C. After several hours of heating of this compound with benzidine in dimethylformamide, there is obtained the di-[3-(beta-oxynaphthoyl)-aminonaphthalyl]-benzidine as a brownish-yellowish powder which melts at above 360° C.

Example 6

15.2 g. of m-nitro-p-toluidine are stirred into a paste with 33.2 cc. of 37% hydrochloric acid and 33 cc. of water. After cooling to 0° C. it is vigorously stirred with a solution of 6.9 g. of sodium nitrite in 35 cc. of water and the stirring is continued for about an additional one and one-half hours. The diazonium salt solution is filtered and introduced into a suspension of the coupling component which is obtained as follows: 49.5 g. of 3-p-acetoacetylaminobenzoylaminonaphthalic acid-N-phenylimide are dissolved in 400 cc. of alcohol and 60 cc. of 20% aqueous sodium hydroxide and then precipitated by the addition of 20 g. of 90% acetic acid. The reaction mixture is reacted with 20 g. of sodium acetate and coupled.

After combining of the two components the dye suspension is further stirred for an additional 3 hours, heated to boiling and subsequently stirred while cold. The reaction mixture is filtered, washed and dried at approximately 60° C. The new pigment dye is obtained in a yield of 64.5 g. and it is difficultly soluble in most organic solvents. It is a luminous yellowish powder.

The 3-(p-acetoacetylaminobenzoyl)-aminonaphthalic acid-N-phenylimide which is used as the coupling component in this example is obtained from the 3-(p-aminobenzoylamino)-naphthalic acid phenylimide of Example 1 by known methods, for example, by condensing of this compound with acetoacetyl ethyl ester. The new coupling component is pale yellow, can be recrystallized from nitrobenzene and melts at 260–262° C. (with decomposition).

Example 7

0.38 g. of sodium nitrite is dissolved at 20–30° C. in 7 cc. of 96% sulfuric acid. 1.45 g. of di-(4-aminonaphthalyl)-benzidine are introduced into the nitrosyl-sulfuric acid at 35° C. and stirred for one hour. The reaction mixture is then poured onto about 100 g. of ice and the suspension is stirred for an additional 45 minutes. Then the diazonium compound is added to a suspension of 1.63 g. of 1-(acetoacetylamino)-2,5-dimethoxy-4-chlorobenzene which is obtained as follows: this compound is dissolved in cold 90% acetic acid and by pouring onto about 150 g. of ice precipitates in very fine form, and prior to the coupling is mixed with 3.00 g. of caustic soda in 20 cc. of water.

The coupling is accomplished by the dropwise addition of the diazo suspension while simultaneously adding a solution of 6.86 g. of caustic soda in 50 cc. of water whereby the pH value is maintained at about 2–3. The stirring is continued for an additional 10 minutes, the reaction mass is slowly heated to boiling and filtered while still hot.

The dye is washed and dried at about 60° C. The yield amounts to 2.5 g. The new diazo dye is a reddish-orange colored powder and is difficultly soluble in most organic solvents.

To produce the di-(4-aminonaphthalyl)-benzidine, 4-nitronaphthalic acid anhydride is condensed with benzidine by cooking for 5 hours in glacial acetic acid containing the benzidine. By the subsequent addition of iron powder and several hours of heating of 100° C. there is formed di-(4-aminonaphthalyl)-benzidine which is filtered, washed with glacial acetic acid and subsequently with sodium bicarbonate solution, and purified by recrystallization from 96% sulfuric acid. The new compound is a brownish-yellow powder which melts at above 360° C.

Example 8

1.45 g. of di-(4-aminonaphthalyl)-benzidine are dissolved in the cold in 7 cc. of 96% sulfuric acid, by the dropwise addition into 150 cc. of ice water, precipitated in very fine form, and slowly diazotized at 0° C. with a solution of 0.38 g. of sodium nitrite in 15 cc. of water. The diazonium salt is subsequently added to a suspension of 1.44 g. of 2-(2′,3′-oxynaphthoylamino)-toluene which is obtained by dissolving the compound in a solution 0.40 g. of caustic soda in 75 cc. of water at 70° C., cooling to 20° C. and very finely precipitating with 10 cc. of 90% acetic acid.

The coupling is accomplished by the dropwise addition at 20° C. of 9.4 g. of caustic soda dissolved in 50 cc. of water so that the solution is maintained at a pH value of approximately 3. Stirring is continued for an additional 30 minutes and the reaction mixture is heated for a short time to boiling. After cooling, filtering under suction and washing till neutral the precipitate is dried at 60° C. The yield amounts to 2.5 g. The new diazo dye is a violet powder which is difficultly soluble in most organic solvents.

Example 9

5.35 g. of 4-aminonaphthalic acid anhydride are dissolved in 1.99 g. of caustic soda and 80 cc. of water under boiling, and at 0° C. reacted with 1.75 g. of sodium nitrite in 15 cc. of water. This solution is poured into 8.50 cc. of hydrochloric acid (37%) which is diluted with 30 cc. of ice water, and the reaction mixture is stirred for 45 minutes.

The resulting diazo suspension is added at room temperature to a solution of 6.94 g. of 2-(2′,3′-oxynaphtholylamino)-toluene, 4.30 g. of caustic soda and 100 cc. of water. The resulting deep, dark red colored solution is heated to boiling, acidified with hydrochloric acid pH of 1, whereby a red-violet dye precipitates. After cooling, the dye suspension is filtered off under suction, washed and dried at 60° C. The yield amounts to 12.50 g.

12.50 g. of the mono-azo dye produced as described above are heated with 23.50 g. of aniline in an oil bath at 140° C. The dye goes temporarily into solution, and then, however, solidifies, rather suddenly, to a solid crystalline paste, whereby the temperature increases to 170° C. The temperature is maintained at 160° C. for an additional twenty minutes. After cooling, the excess aniline is removed by steam distillation, the red-violet crystalline precipitate is filtered off, washed first with dilute hydrochloric acid and then with water, and then dried at 60° C. The yield amounts to 14.00 g. The dye melts, after recrystallization from benzoic acid-ethyl ester at 325° C.

Example 10

5.35 g. of 4-aminonaphthalic acid anhydride are dissolved in 1.99 g. of caustic soda and 80 cc. of water under boiling, and reacted at 0° C. with 1.75 g. of sodium nitrite in 15 cc. of water. This solution is added during twenty minutes to 8.50 cc. of hydrochloric acid (37%) which is diluted with 30 cc. of ice water, and the reaction mixture is then stirred for an additional forty-five minutes.

The resulting diazo suspension is added dropwise at 15°–20° C. to a solution of 4.75 g. of 4,4'-di-(acetoacetylamino)-3,3'-dimethyl-diphenyl in 4.30 g. of caustic soda and 100 cc. of water.

After completion of the coupling reaction, the reaction mixture is acidified to pH of 1 with hydrochloric acid, heated to boiling, filtered, washed and dried at 60° C. The yield amounts to 9.50 g.

2.00 g. of the thus obtained dark brown powder are cooked for one hour with 20 cc. of aniline under refluxing, then diluted with 20 cc. of alcohol, filtered, washed with alcohol and dried at 60° C.

The dye is brownish-organge, is insoluble in most organic solvents, and is not recrystallizable even from high boiling solvents. It does not melt below 360° C.

Example 11

3.32 g. of 3-(p-aminobenzoylamino)-naphthalic acid anhydride are dissolved under boiling in 0.85 g. of caustic soda and 50 cc. of water. At 20° C. there is added thereto 6.00 cc. of hydrochloric acid (31%) and it is diazotized at 0° C. with a solution of 0.70 g. of sodium nitrite in 7 cc. of water. The reaction mixture is stirred for one hour, and the resulting diazo suspension is added dropwise at 20° C. to a solution of 2.80 g. of 2-(2',3'-oxynaphthoylamino)-toluene, 1.20 g. of caustic soda and 50 cc. of water. During the coupling, an additional 8 cc. of 10% caustic soda solution is added, so that at the end of the coupling reaction the dye suspension has a pH value of 7.5–8.

After three hours of stirring, the suspension is acidified with 5.0 cc. of hydrochloric acid (31%), heated to boiling, filtered, washed and dried at 60° C. The yield amounts to 6.00 g.

2.00 g. of the new, blue-tinged red monoazo dyestuff are heated under refluxing for one hour in 20 cc. of 3,5-dimethylaniline. After cooling, the excess amine is removed by steam distillation, the imide-dye is filtered, washed first with dilute hydrochloric acid, then with water and then dried at 60° C. After recrystallization from nitrobenzene there is obtained a luminous yellow-tinged red pigment dye which melts at 331° C.

To produce the 3 - (p-aminobenzoylamino)-naphthalic acid anhydride, one starts with 3-aminonaphthalic acid anhydride and condences the same according to known methods with b-nitrobenzoylchloride. The resulting 3-(p-nitrobenzoylamino)-naphthalic acid anhydride is a yellowish substance which can be recrystallized from nitrobenzene and melts at above 360° C. After reduction according to Bechamp there is obtained from the 3-(p-nitrobenzoylamino)-naphthalic acid anhydride the yellow-orange colored 3-(p-aminobenzoylamino)-naphthalic acid anhydride which melts at above 360° C.

What is claimed is:
1. The azo dye obtained by coupling a diazonium salt of 3-(p-aminobenzoylamino)-naphthalic acid imide with 2-(2',3'-oxynaphthoylamino)-toluene.
2. The azo dye obtained by coupling a diazonium salt of 3 - (4' - methoxy - 3'-aminobenzenesulfonyl)-aminonaphthoxy-4-chlorobenzene.
3. The azo dye obtained by coupling a diazonium salt of dichloroaniline with 4-(beta-oxynaphthoylamino)-naphthalic acid-N-phenylimide.
4. The azo dye obtained by coupling a diazonium salt of dichloroaniline with 3-(beta-oxynaphtholyamino)-naphthalic acid-N-phenylimide.
5. The azo dye obtained by coupling a diazonium salt of 6-chloro-2-aminotoluene with di-[3-(beta-oxynaphthoyl)-aminonaphthalyl]-benzidine.
6. The azo dye obtained by coupling a diazonium salt of m-nitro-p-toluidine with 3-(p-acetoacetylaminobenzoyl)-aminonaphthalic acid-N-phenylimide.
7. The azo dye obtained by coupling a diazonium salt of di-(4-aminonaphthalyl)-benzidine with 1-(acetoacetylamino)-2,5-dimethoxy-4-chlorobenzene.
8. The azo dye obtained by coupling a diazonium salt of di-(4-aminonaphthalyl)-benzidine with 2-(2',3'-oxynaphtholyamino)-toluene.

References Cited

UNITED STATES PATENTS

| | | | |
|---|---|---|---|
| 1,758,313 | 5/1930 | Eckert et al. | 260—152 |
| 2,159,542 | 5/1939 | Apotheker et al. | 260—206 XR |
| 2,961,438 | 11/1960 | Fuchs et al. | 260—152 |

FOREIGN PATENTS

| | | |
|---|---|---|
| 1,265,488 | 5/1961 | France. |
| 203,606 | 6/1939 | Switzerland. |

OTHER REFERENCES

Arcoria, C. A., vol. 54, pp. 3275–3276 (1960) QD1. A51.

Arcoria et al., Ann. di chim. (Rome), vol. 51, pp. 124–129 (1961) QD1. A68.

Arcoria et al., Ann. di Chim. (Rome), vol. 51, pp. 124–426–433 (1961) QD1. A68.

FLOYD D. HIGEL, *Primary Examiner.*